(12) United States Patent  
Liang et al.

(10) Patent No.: US 8,446,393 B2
(45) Date of Patent: May 21, 2013

(54) STYLUS

(75) Inventors: Shi-Xu Liang, Shenzhen (CN); Chuan-I Liu, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 365 days.

(21) Appl. No.: 12/862,868

(22) Filed: Aug. 25, 2010

(65) Prior Publication Data

US 2011/0292000 A1  Dec. 1, 2011

(51) Int. Cl.
*G06F 3/041* (2006.01)
*G06F 3/033* (2006.01)
*G06K 11/06* (2006.01)
*G08C 21/00* (2006.01)

(52) U.S. Cl.
USPC ........................................ 345/179; 178/19.01

(58) Field of Classification Search
USPC .............................. 178/19.01–19.07; 345/179
See application file for complete search history.

(56) References Cited

U.S. PATENT DOCUMENTS

| | | | | |
|---|---|---|---|---|
| 5,061,104 A | * | 10/1991 | Florjancic | 401/195 |
| 6,464,419 B1 | * | 10/2002 | Chan | 401/131 |
| D498,259 S | * | 11/2004 | Kung | D19/46 |
| D526,682 S | * | 8/2006 | Ortiz et al. | D19/36 |
| 7,146,667 B2 | * | 12/2006 | Elsener | 7/118 |
| 2010/0090988 A1 | * | 4/2010 | Park | 345/179 |

FOREIGN PATENT DOCUMENTS

EP  1354672 B1 * 10/2009

* cited by examiner

*Primary Examiner* — Dwayne Bost
*Assistant Examiner* — Larry Sternbane
(74) *Attorney, Agent, or Firm* — Altis Law Group, Inc.

(57) ABSTRACT

A stylus includes a housing, a stylus body including a tip, a pen including a head, a first rotating member and a second rotating member. The first rotating member is coupled between the housing and the stylus body so the stylus body rotatably engages with the housing. The second rotating member is coupled between the housing and the pen so the pen rotatably engages with the housing. When the stylus body rotates relative to the housing, the tip moves from a first side of the first rotating member to a second side of the first rotating member opposite to the first side of the first rotating member; when the pen rotates relative to the housing, the head moves from a first side of the second rotating member to a second side of the second rotating member opposite to the first side of the second rotating member.

20 Claims, 6 Drawing Sheets

STYLUS

CROSS-REFERENCE TO RELATED APPLICATIONS

The present application is related to co-pending U.S. patent application Ser. No. 12/862,867, entitled "STYLUS", by Liang et al. This application has the same assignee as the present application and has been concurrently filed herewith. The above-identified applications are incorporated herein by reference.

BACKGROUND

1. Technical Field

This exemplary disclosure generally relates to retractable/extendable styluses.

2. Description of Related Art

It is well-known that a variety of devices include a touch screen. Examples of such devices include smart phones, personal digital assistants (PDA), pagers, and personal organizers. These devices typically include a display module under the touch screen. The display module generates target images associated with menu options, programs, user choices, and other operations. The user controls the device by pressing the touch screen over the target image with a stylus. However, typical styluses have no other functions like a pen for writing on a paper.

Therefore, there is room for improvement within the art.

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability. Accordingly, any reference herein to the mobile telephone should also be considered to apply equally to other portable wireless electronic devices.

Figure 1:
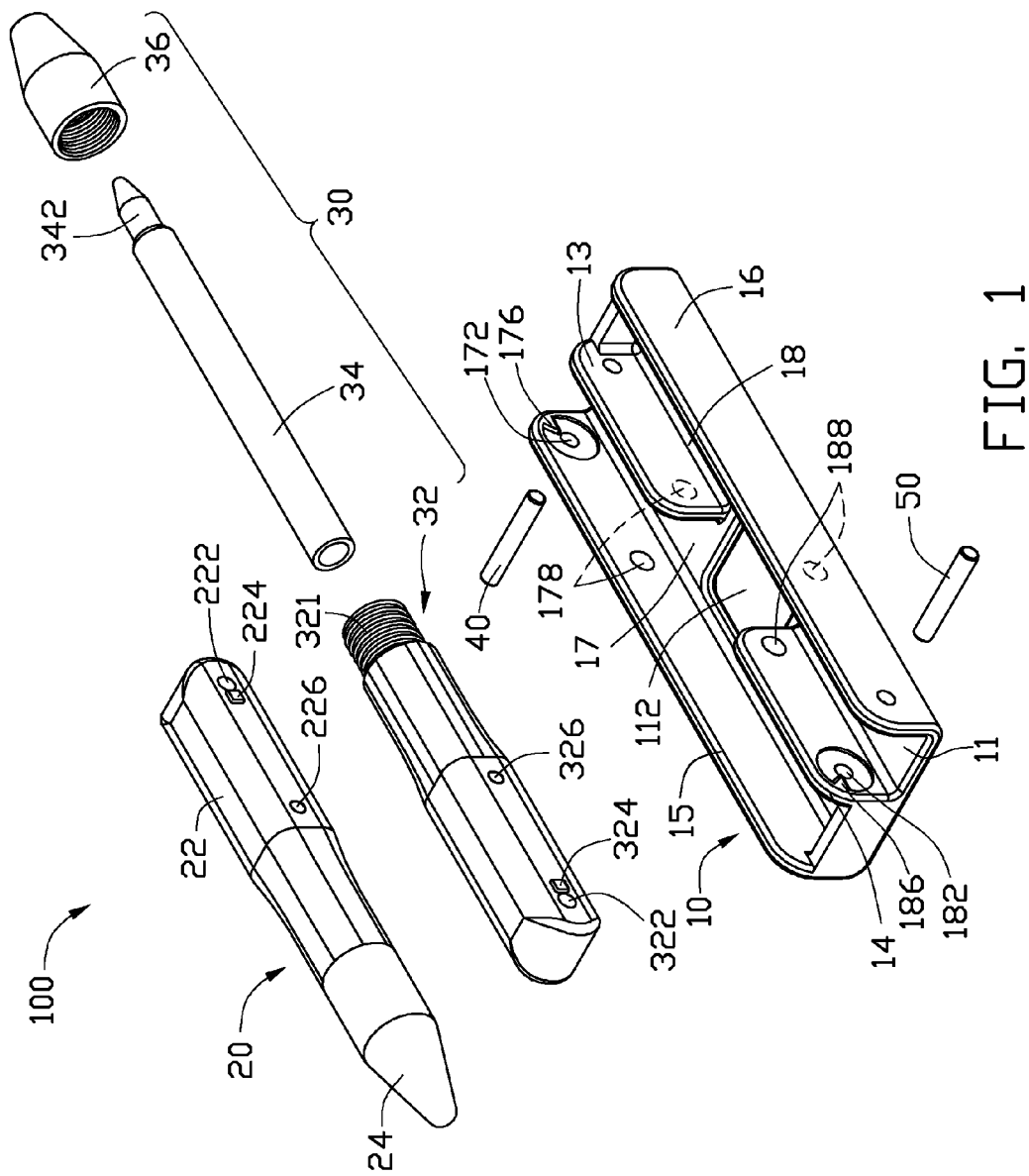
FIG. 1 is an exploded view of an exemplary embodiment of a stylus.
Figure 2:
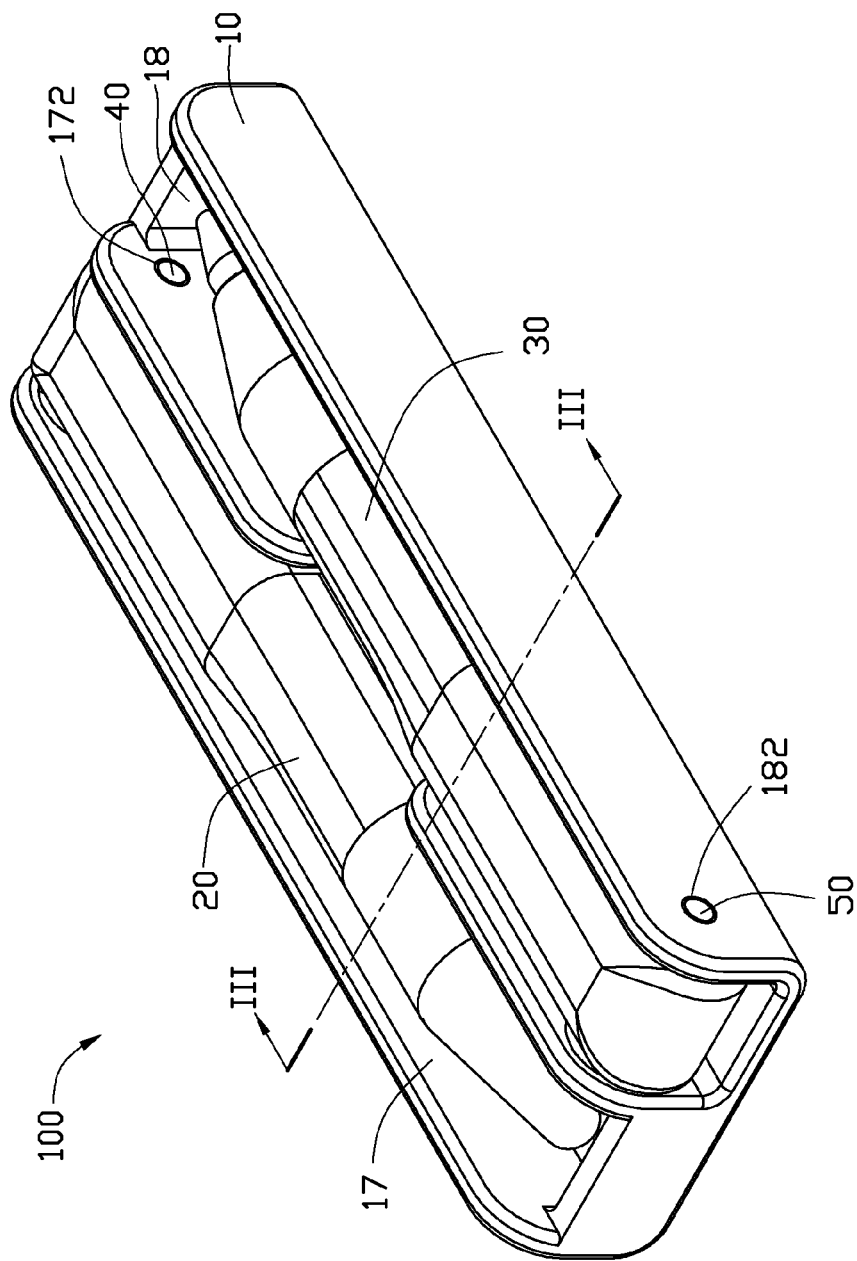
FIG. 2 is an assembled view of the stylus shown in FIG. 1.

Referring to FIGS. 1 and 2, a stylus 100 includes a housing 10, a stylus body 20 and a pen 30. The stylus body 20 is rotatably coupled to the housing 10 by a first rotating member (not labeled), and the pen 30 is rotatably coupled to the housing 10 by a second rotating member (not labeled). In a closed state shown in FIG. 2, the stylus body 20 and the pen 30 are both located in the housing 10 so the stylus 100 is shortened to improve the portability of the stylus 100. In a first open state shown in FIG. 6, the pen 30 is located in the housing 10 while the stylus body 20 is rotated outwards from the housing 10 to lengthen the stylus 100 to improve the using convenience of the stylus body 20. In a second open state shown in FIG. 4, the stylus body 20 is located in the housing 10 while the pen 30 is rotated outwards from the housing 10 so the pen 30 slides out of the housing 10, thereby the pen 30 is ready for use.

Referring to FIGS. 1-2, the housing 10 includes a bottom wall 11, a first sidewall 15 protruding from the bottom wall 11, a second sidewall 16 protruding from the bottom wall 11 opposite to the first sidewall 15, a first plate 13 located near one end of the bottom wall 11 between the first sidewall 15 and the second sidewall 16, and a second plate 14 located near another end of the bottom wall 11 between the first sidewall 15 and the second sidewall 16. The housing 10 further defines a first groove 17 and a second groove 18 spaced apart from the first groove 17, the first groove 17 is enclosed by the bottom wall 11, the first sidewall 15, the first plate 13 and the second plate 14. The second groove 18 is enclosed by the bottom wall 11, the second sidewall 16, the first plate 13 and the second plate 14. The first groove 17 is for accommodating the stylus body 20 and the second groove 18 is for accommodating the pen 30. The stylus body 20 includes a body 22 having a first body end (not labeled), a second body end (not labeled) opposite to the first body end, and a tip 24 protruding from the first body end. The tip 24 is used to contact a touch screen display of an electronic device (not shown). The pen 30 may include a shell 32 defining a compartment (not shown) therein, a threaded portion 321 formed on an outer surface thereof, a pen body 34 including a main body 34 and a head 342 protruding from one end of the main body 34, and a cover 36. The main body 34 is accommodated in the compartment 322 and the head 342 extends out of the compartment. The cover 36 is screwed on the threaded portion 321 to hold the pen body 34 in the compartment.

Referring to FIGS. 1-2, the first rotating member is coupled between the housing 10 and the stylus body 20 so the stylus body 20 rotatably engages with the housing 10. The first rotating member, in this exemplary embodiment, includes a shaft 40, an orifice 222 that engages the shaft 40. The orifice 222 is defined though the body 22. The shaft 40 is retained on the housing 10 and rotatably extending into the orifice 222 so the stylus body 20 is rotatable about the shaft 40 relative to the housing 10. The shaft 40 may be retained on the housing 10 in such a way that the housing 10 defines two aligned first retaining holes 172 and each end of the shaft 40 is retained (e.g., hot-melted) in one of the first retaining holes 172. In this exemplary embodiment, one first retaining hole 172 is defined through the first sidewall 15 and another first retaining hole 172 is defined through the first plate 13.

Referring to FIGS. 1-2, the second rotating member is coupled between the housing 10 and the pen 30 so the pen 30 rotatably engages with the housing 10. The second rotating member, in this embodiment, includes a pin 50, a pin hole 322 that engage the pin 50. The pin hole 322 is transversely defined through the shell 32 and the pin 50 rotatably extends into the pin hole 322 so the pen 30 can rotate about the pin 50 relative to the housing 10. The pin 50 may be retained on the housing 10 in such a way that the housing 10 defines two aligned second retaining holes 182 and each end of the pin 50 is retained (e.g., hot-melted) in one of the second retaining holes 182. In this embodiment, one second retaining hole 182 is defined through the second sidewall 15 and another second retaining hole 182 is defined through the second plate 14.

Referring to FIG. 1, a first stopping member (not labeled) is coupled between the housing 10 and the stylus body 20. The first stopping member provides a mechanism for holding the stylus body 20 in the closed state shown in FIG. 2, i.e., holding the stylus body 20 in the first groove 17. The first stopping member, in this embodiment, includes a set of first protrusions 226 and a set of first slots 178 that are detachably engaged with the first protrusions 226. The first protrusions 226 are positioned on the stylus body 20 and the first slots 178 are positioned on the housing 10. Each protrusion 226 is latched in one of the first slots 178 to hold the stylus body 20 in the closed state shown in FIG. 2. It is understood that one of ordinary skill in the art will appreciate that the first stopping member that includes the first protrusions 226 and the first slots 178 are only one example. It is also understood that the first protrusions 226 may be positioned on either the stylus body 20 or the housing 10 and the protrusion engaging members (e.g. first slots 178) may be positioned on the element opposite the first protrusions 226.

Referring to FIG. 1, a second stopping member (not labeled) is coupled between the housing 10 and the stylus body 20. The second stopping member provides a mechanism for holding the stylus body 20 in the first open state shown in FIG. 6 so the stylus 100 is lengthened to facilitate using it. The second stopping member, in this embodiment, includes a set of first blocks 224 and a set of first projections 176 that engage the first blocks 224. The first blocks 224 are positioned on the stylus body 20 and the first projections 176 are positioned on the housing 10. Each first block 224 resists against one of the first projections 176 to hold the stylus body 20 in the first open state shown in FIG. 6. It is understood that one of ordinary skill in the art will appreciate that the second stopping member comprises the first blocks 224 and the first projections 176 are only one example. It is also understood that the first blocks 224 may be positioned on either the stylus body 20 or the housing 10 and the first block engaging members (e.g. first projections 176) may be positioned on the element opposite the first blocks 224.

Figure 3:
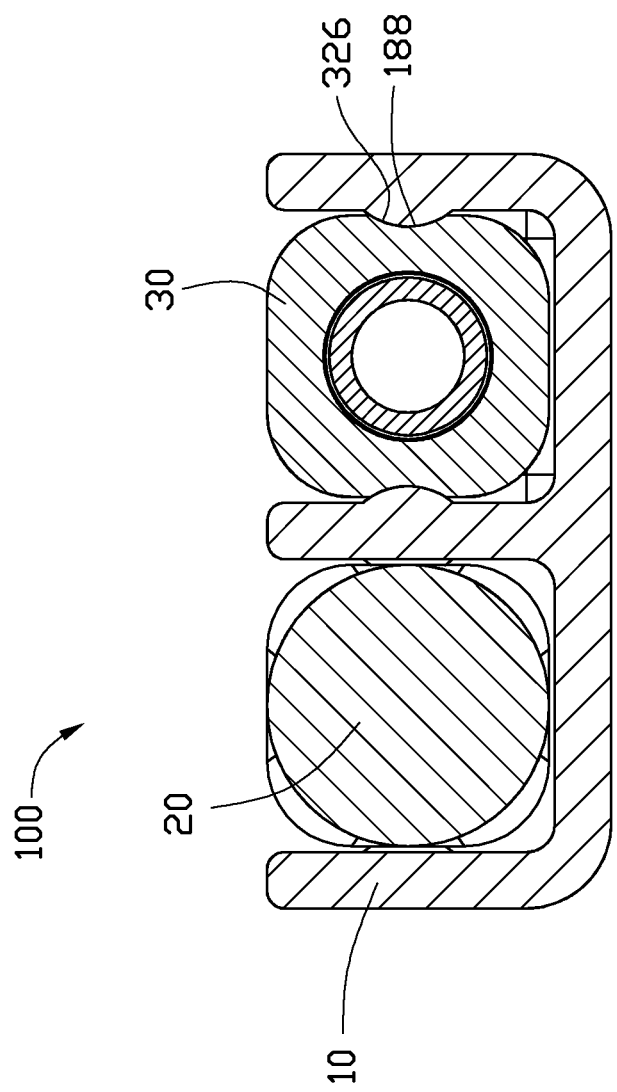
FIG. 3 is a cross-sectional view of the stylus in FIG. 2 along the line and the stylus is in a closed state.

Referring to FIG. 1, a third stopping member (not labeled) is coupled between the stylus body 20 and the pen 30. The third stopping member provides a mechanism for holding the pen 30 in the closed state shown in FIG. 2. The third stopping member, in this embodiment, includes a set of second protrusions 326 and a set of second slots 188 that engage the second protrusions 326. The second protrusions 326 are positioned on the pen 30 and the second slots 188 are positioned on the housing 10. Referring to FIG. 3, each second protrusion 326 is latched in one of the first slots 289 to hold the pen 30 in the closed state shown in FIG. 2. It is understood that one of ordinary skill in the art will appreciate that the third stopping member includes the second protrusions 326 and the second slots 188 are only one example. It is also understood that the second protrusions 326 may be positioned on either the stylus body 20 or the pen 30 and the second protrusion engaging members (e.g. second slots 188) may be positioned on the housing 10 opposite the second protrusions 326.

Figure 4:
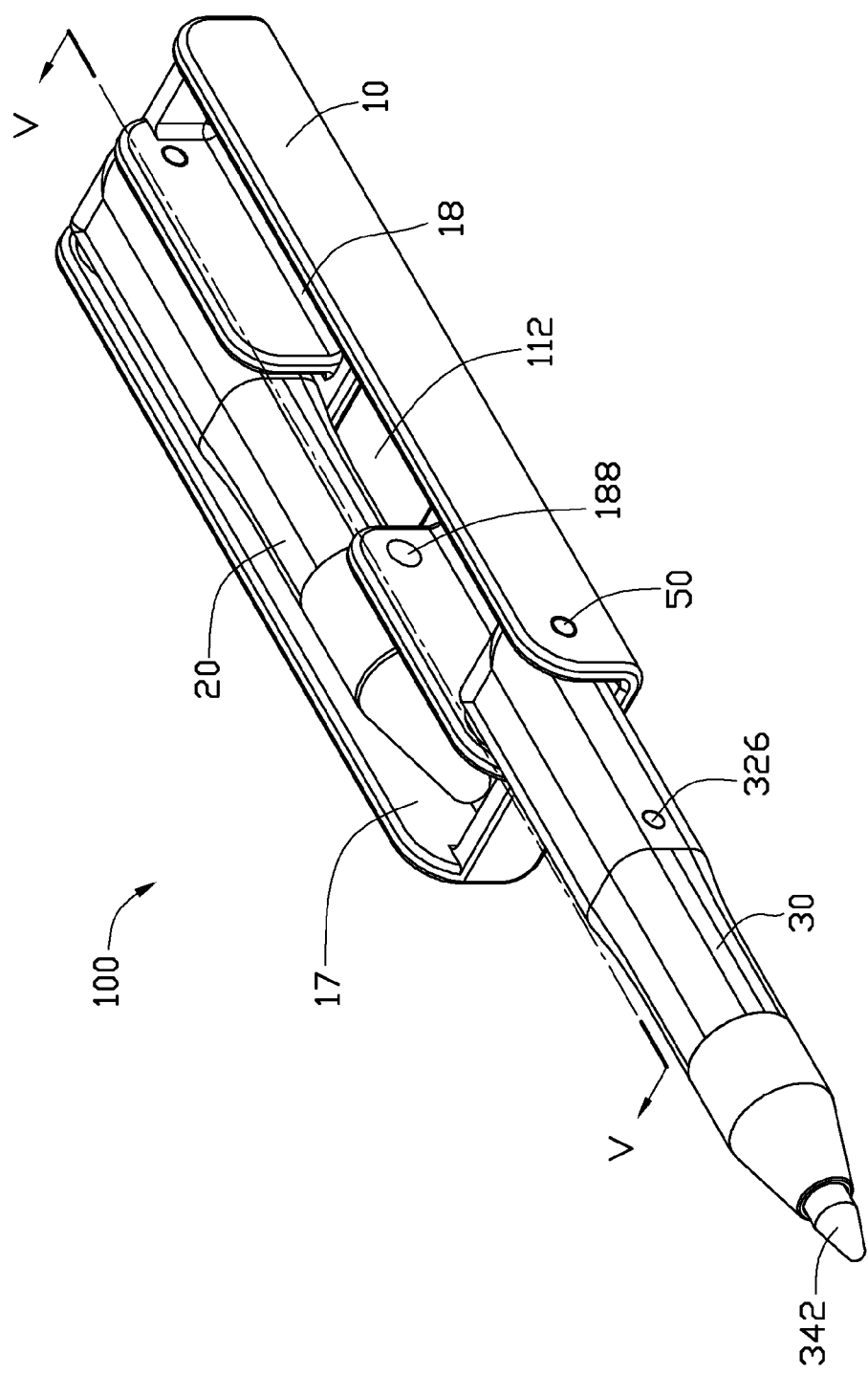
FIG. 4 is similar to FIG. 2, but a pen is rotated outwards from a housing.
Figure 5:
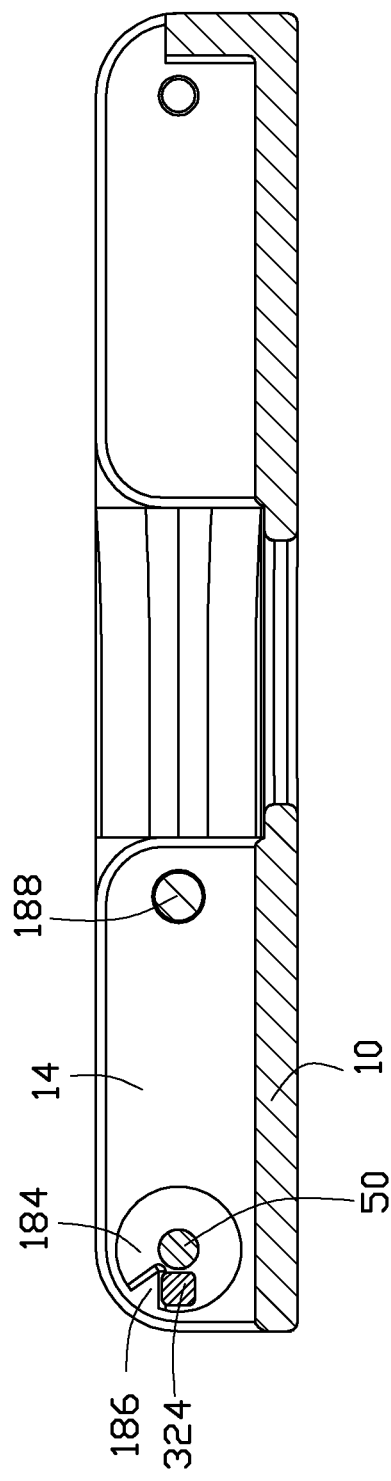
FIG. 5 is a cross-sectional view of the stylus in FIG. 4 along the line V-V.

Referring to FIG. 1, a fourth stopping member (not labeled) is coupled between the stylus body 20 and the pen 30. The fourth stopping member provides a mechanism for holding the pen 30 in the second open state shown in FIG. 4. The fourth stopping member, in this embodiment, includes a set of second blocks 324 and a set of second projections 186 that engage the second blocks 324. The second blocks 324 are positioned on the pen 30 and the second projections 186 are positioned on the housing 10. Referring to FIG. 5, each second block 324 resists against one of the second projections 186 to hold the pen 30 in the second open state shown in FIG. 4. It is understood that one of ordinary skill in the art will appreciate that the fourth stopping member includes the second blocks 324 and the second projections 186 are only one example. It is also understood that the second blocks 324 may be positioned on either the stylus body 20 or the pen 30 and the second block engaging members (e.g. second projections 186) may be positioned on the housing 10 opposite the second blocks 324.

Referring to FIGS. 1-4, to assemble the stylus 100, the pen body 34 is inserted into the compartment, and the cover 36 is screwed on the threaded portion 321 to form an assembled pen 30. The stylus body 20 is received in the first groove 17 with the orifice 222 aligned with the first retaining holes 172 and the first protrusions 226 latched in the first slots 178. The shaft 40 is inserted in the first retaining holes 172 and the orifice 222. The pen 30 is received in the second groove 18 with the pin hole 322 aligned with the second retaining holes 182 and the second protrusions 326 latched in the second slots 188. Finally, the pin 50 is inserted in the second retaining holes 182 and the pin hole 322.

Figure 6:
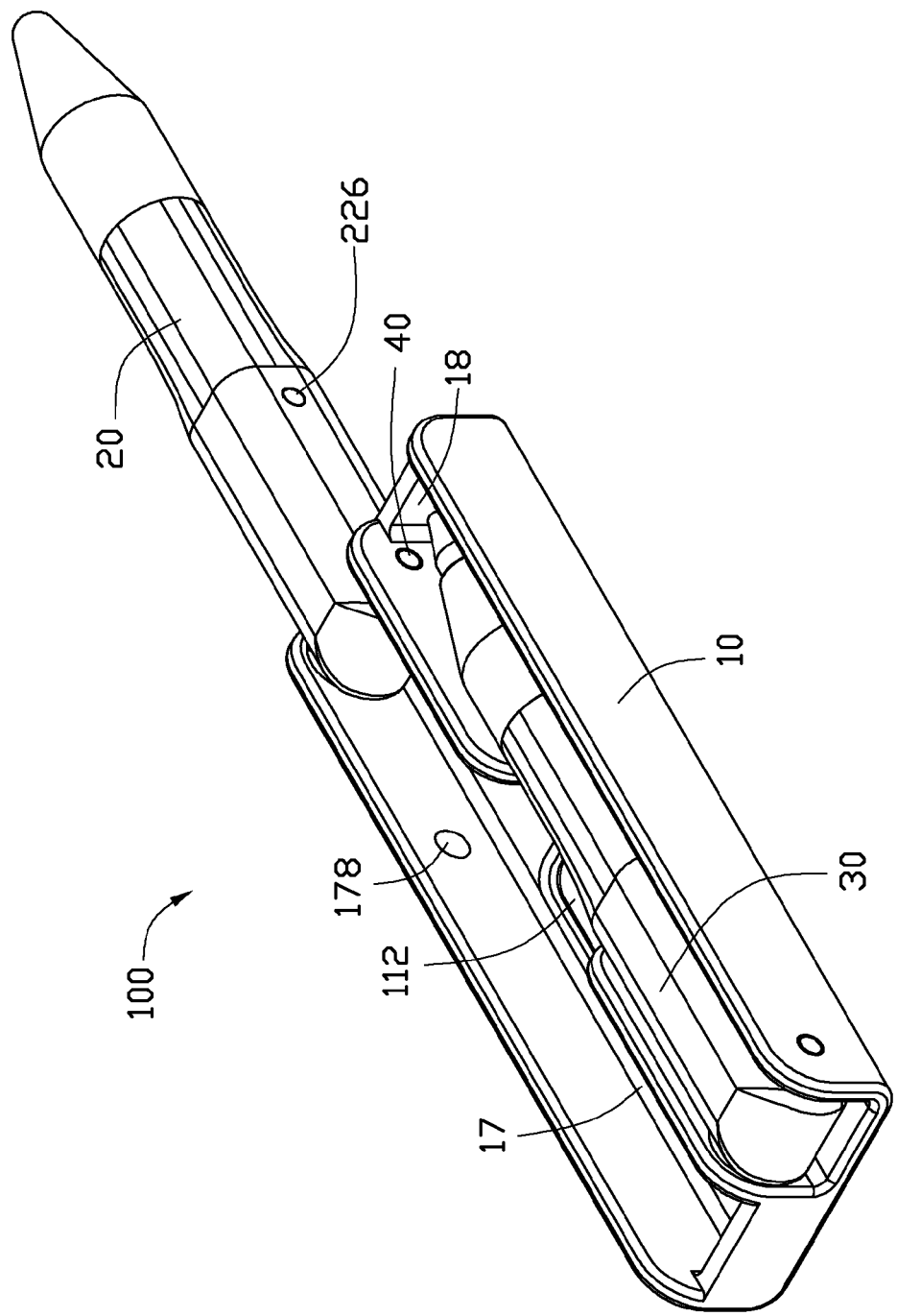
FIG. 6 is similar to FIG. 2, but a stylus body is rotated outwards from the housing.

Referring to FIGS. 2 and 6, in operation, the stylus body 20 may rotate about the shaft 40 relative to the housing 10 to make the first protrusions 226 slide out of the first slots 178, until the tip 24 moves from a first side of the shaft 40 to a second side of the shaft 40. Thus, the stylus body 20 slides out of the first groove 17 to lengthen the stylus 100 for facilitating using the stylus 100. At this time, the first blocks 224 resist against the first projections 176 to hold the stylus body 20 in the first open state. Referring to FIG. 4, the pen 30 may rotate about the pin 50 relative to the housing 10 to make the second protrusions 326 slide out of the second slots 188, until the head 342 moves from a first side of the pin 50 to a second side of the pin 50. At this time, referring to FIG. 5, the second blocks 324 resist against the second projections 186 to hold the pen 30 in the second open state.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
 a housing comprising a bottom wall, a first sidewall protruding from the bottom wall, a second sidewall protruding from the bottom wall opposite to the first sidewall, a first plate and a second plate correspondingly located near two opposite ends of the bottom wall between the first sidewall and the second sidewall; the second plate collinear with the first plate and spaced apart from the first plate; the housing further defining a first groove enclosed by the bottom wall, the first sidewall, the first plate and the second plate and a second groove enclosed by the bottom wall, the second sidewall, the first plate, and the second plate;

a stylus body including a tip, the stylus body accommodated in the first groove;
a pen including a head, the pen accommodated in the second groove;
a first rotating member coupled between the housing and the stylus body so the stylus body rotatably engages with the housing; and
a second rotating member coupled between the housing and the pen so the pen rotatably engages with the housing;
wherein when the stylus body rotates relative to the housing, the tip moves from a first side of the first rotating member to a second side of the first rotating member opposite to the first side of the first rotating member; when the pen rotates relative to the housing, the head moves from a first side of the second rotating member to a second side of the second rotating member opposite to the first side of the second rotating member.

2. The stylus as claimed in claim 1, wherein the first rotating member comprises a shaft, and an orifice that engages the shaft.

3. The stylus as claimed in claim 2, wherein the orifice is defined though the stylus body, and the shaft is retained on the housing and rotatably extending into the orifice so the stylus body is rotatable about the shaft relative to the housing.

4. The stylus as claimed in claim 3, wherein the shaft is retained on the housing in such a way that the housing defines two first retaining holes and each end of the shaft is retained in one of the first retaining holes.

5. The stylus as claimed in claim 4, wherein a first stopping member is coupled between the housing and the stylus body to hold the stylus body in a closed state.

6. The stylus as claimed in claim 5, wherein the first stopping member includes a set of first protrusions and a set of first slots that detachably engage the first protrusions.

7. The stylus as claimed in claim 6, wherein the first protrusions are positioned on the stylus body and the first slots are positioned on the housing, each protrusion is latched in one of the first slots to hold the stylus body in the closed state.

8. The stylus as claimed in claim 7, wherein a second stopping member is coupled between the housing and the stylus body to hold the stylus body in a first open state.

9. The stylus as claimed in claim 8, wherein the second stopping member includes a set of first blocks and a set of first projections that engage the first blocks.

10. The stylus as claimed in claim 9, wherein the first blocks are positioned on the stylus body and the first projections are positioned on the housing, each first block resists against one of the first projections to hold the stylus body in the first open state.

11. The stylus as claimed in claim 1, wherein the second rotating member comprises a pin, and a pin hole that engages the pin.

12. The stylus as claimed in claim 11, wherein the pin hole is transversely defined through the pen; the pin is positioned on the housing and rotatably extends into the pin hole so the pen can rotate about the shaft relative to the housing.

13. The stylus as claimed in claim 12, wherein a third stopping member is coupled between the housing and the pen to hold the pen in a closed state.

14. The stylus as claimed in claim 13, wherein the third stopping member includes a set of second protrusions and a set of second slots that engage the second protrusions.

15. The stylus as claimed in claim 14, wherein the second protrusions are positioned on the pen and the second slots are positioned on the housing, each second protrusion is latched in one of the first slots to hold the pen in the closed state.

16. The stylus as claimed in claim 15, wherein a fourth stopping member is coupled between the housing and the pen to hold the stylus body in a second open state.

17. The stylus as claimed in claim 16, wherein the fourth stopping member includes a set of second blocks and a set of second projections that engage the first blocks.

18. The stylus as claimed in claim 17, wherein the second blocks are positioned on the pen and the second projections are positioned on the housing, each second block resists against one of the second projections to hold the stylus body in the first open state.

19. A stylus, comprising:
a housing comprising a bottom wall, a first sidewall protruding from the bottom wall, a second sidewall protruding from the bottom wall opposite to the first sidewall, a first plate and a second plate correspondingly located near two opposite ends of the bottom wall between the first sidewall and the second sidewall; the second plate collinear with the first plate and spaced apart from the first plate; the housing further defining a first groove enclosed by the bottom wall, the first sidewall, the first plate and the second plate and a second groove enclosed by the bottom wall, the second sidewall, the first plate, and the second plate;
a stylus body including a tip, the stylus body accommodated in the first groove;
a pen including a head, the stylus body accommodated in the first groove;
a shaft rotatably mounting the stylus body to the housing;
a pin rotatably mounting the stylus body to the housing;
wherein when the pen is in a closed state, the tip is located at a first side of the shaft, the head is located at a first side of the pin; when the stylus is in a first open state, the tip is located at a second side of the shaft opposite to the first side of the shaft while the head is located at the first side of the pin; when the stylus is in a second open state, the tip is located at the first side of the shaft while the head is located at the second side of the pin opposite to the first side of the pin.

20. A stylus, comprising:
a housing comprising a bottom wall, a first sidewall protruding from the bottom wall, a second sidewall protruding from the bottom wall opposite to the first sidewall, a first plate and a second plate corresponding located near two opposite ends of the bottom wall between the first sidewall and the second sidewall; the second plate collinear with the first plate and spaced apart from the first plate; the housing further defining a first groove enclosed by the bottom wall, the first sidewall, the first plate and the second plate and a second groove enclosed by the bottom wall, the second sidewall, the first plate, and the second plate;
a stylus body, the stylus body accommodated in the first groove; and
a pen, the pen accommodated in the second groove;
wherein the stylus body and the pen are pivotally mounted to opposite ends of the housing, and both are selectively operated to be received in one of the grooves to contract the stylus or be rotated outside of the groove to extend the stylus.

* * * * *